Sept. 25, 1962 F. M. RONCI 3,055,125
REINFORCED HEEL AND REPLACEABLE PLASTIC TAP
Filed Aug. 31, 1960
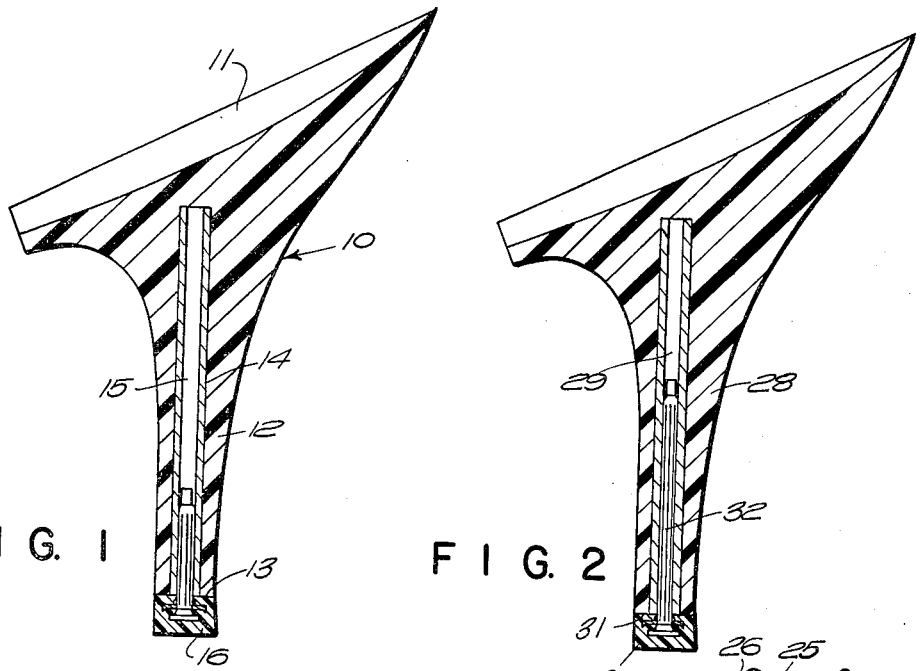
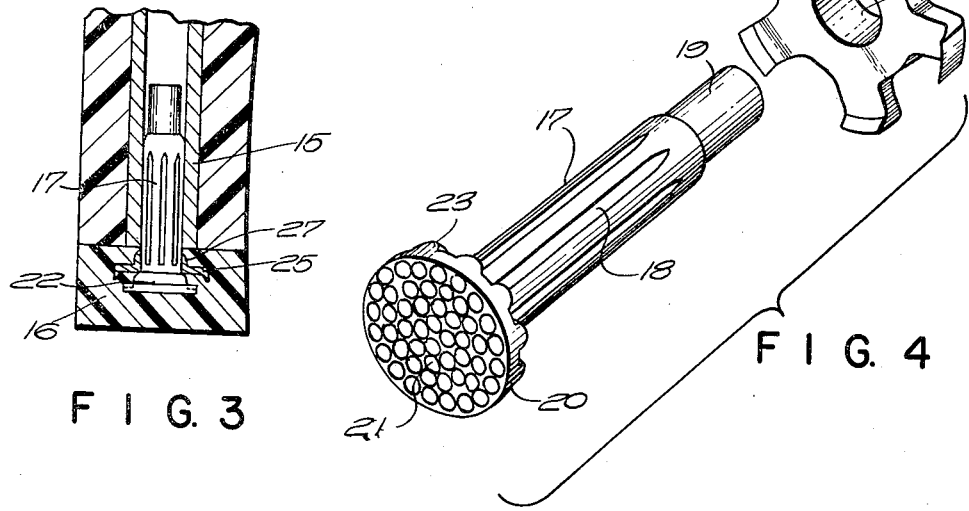
INVENTOR.
FERNANDO M. RONCI
BY
Max Schwartz
ATTORNEY

# United States Patent Office 3,055,125
Patented Sept. 25, 1962

3,055,125
REINFORCED HEEL AND REPLACEABLE PLASTIC TAP
Fernando M. Ronci, 2 Atlantic Blvd., Providence, R.I.
Filed Aug. 31, 1960, Ser. No. 53,244
1 Claim. (Cl. 36—34)

The present invention relates to the shoe making art and more particularly to a novel construction of a reinforced heel and a replaceable tap therefor.

The principal object of the present invention is to provide a replaceable plastic tap for a reinforced plastic heel.

Another object of the present invention is to provide a plastic tap having a novel mounting and anchoring means.

A further object of the present invention is to provide a replaceable plastic tap which has a firm gripping action for retaining the tap on the heel.

The present invention constitutes an improvement over my Patent No. 2,935,800 issued May 10, 1960 and entitled Reinforced Plastic Heel and Removable Tap.

With the above and other objects and advantageous features in view my invention consists of a novel arrangement of parts more fully disclosed in the detailed description following in conjunction with the accompanying drawings and more particularly defined in the appended claim.

In the drawings,

FIG. 1 is a vertical section of a plastic heel and tap embodying my invention.

FIG. 2 is a view similar to FIG. 1 showing a modified form of my invention.

FIG. 3 is an enlarged section of the lower portion of the heel showing the tap mounting.

FIG. 4 is an enlarged exploded perspective view of the tap holding and mounting means.

Due to the Italian influence, women's shoes are now usually made of plastic material having extremely narrow heel portions of less than one half inch in diameter. To provide such a heel with sufficient strength they have been provided with central openings and the tap has been held in place by a hardened steel reinforcing core forced into the opening. However, the extremely small tap was found to wear very quickly and had to be replaced. In my patent hereinabove referred to I have devised a construction in which the reinforcement is provided by a hollow tube into which the reinforcing core could be threaded or driven. Furthermore, the original metal taps are rapidly being replaced by nylon, or other plastic taps which are normally molded to the head of the reinforcing core. In actual use it has been found that the walking strain on the small plastic tap causes a distortion which tends to snap the tap from the reinforcing core. The present invention has therefore been designed to include the reinforcing features of my aforementioned patent with a novel construction of tap mounting which ensures a firm grip and easy replacement.

Referring more in detail to the drawings, FIG. 1 shows a modern type of plastic heel 10 having a broad top portion 11 tapering to a very narrow elongated portion 12 terminating in the tread end 13. The heel 10 is preferably molded of plastic material and is provided with a vertical opening 14 extending from the tread end 13 upwardly through the narrow portion 12 and into the broad top portion 11. If desired, the opening 14 may be extended upwardly completely through the heel. Reinforcement of the heel is provided by a tube 15 made of tempered steel. The tube 15 can be hardened to a greater degree than a solid reinforcing core. As set forth in my patent above referred to, the tube 15 may be provided with a split seam (not shown). It is contemplated that the tube 15 have an outside diameter slightly greater than that of the opening 14 in the heel. Thus the tube 15 may be forced into the opening 14 until its lower end is flush with the tread end 13 of the heel. The tube is thus frictionally and tightly held in place and provides the necessary strength for the narrow portion of the heel 10.

Now referring to FIGS. 3 and 4, a plastic tap 16 is removably and replaceably held at the tread end of the heel by the construction shown therein. The tap holding and mounting means comprises a solid annular metal shank 17 having longitudinal flutes 18 or other roughened portions. The upper end of the shank 17 is provided with a smooth narrower portion 19 which acts as a locating thrust end. The diameter of the shank 17 is equal to or slightly greater than the inside diameter of the tube 15 to provide an extremely tight frictional fit. The shank 17 is provided at its bottom end with an enlarged head 20 which may be roughened on the outer surface as at 21. The inner surface of the head 20 is provided with a raised portion 22 which extends around the shank and beyond the diameter of the shank as shown in FIG. 3. The under outer surface of the head 20, surrounding the portion 22 may be scalloped as shown at 23 in FIG. 4. I now provide a spider member 24 having a plurality of integral outwardly extending arm portions 25. The outer ends or tips of the arms 25 are bent downwardly at right angles at 26 to produce an inverted cup effect as shown in FIG. 3. The center of the spider 24 is provided with an extruded opening forming a collar 27 which extends upwardly from the spider. The diameter of the collar 27 is equivalent or slightly smaller than the diameter of the shank 17.

In assembling the tap the spider 24 is forced onto the shank 17 until it contacts the portion 22 as shown in FIG. 3. The tap 16 is now molded to the head 20 and spider 24 so that most of the top material extends below the head and the washer shank 27 is just barely covered by the tap material. The roughened portion 21 of the head 20, the scalloped portion 23 of the head 20 and the arms 25 of the spider 24 serve to grip the tap 16 to prevent rotation between the tap and the shank 17 and prevent the tap from snapping off the head 20. Viewing FIG. 3 it will be noted that the plastic material will flow between the bottom of the spider 24 and the scalloped portion of the head 20, the portion 22 acting as a spacer. The depending ends 26 of the arms 25 also act as gripping members and serve to entrap the plastic material in this area.

When the tap 16 is mounted in the tread end 13 of the heel, the thrust end 19 is positioned in the tube 15 and the tap is hammered into place, the shank 17 being forced into the tube 15 as shown in FIGS. 1 and 3. The hammering action would normally have a tendency to distort the material of the tap 16 if carried too far. Therefore, by positioning the collar 27 until it is barely covered by the plastic material it acts as a stop and abuts against the lower end of the tube 15 when the tap is hammered into place. To replace the tap it can be firmly grasped with a pair of pliers or other tool and twisted and pulled out of the tube. This will in no way affect the reinforcement of the heel by the tube 15.

If desired the shank 17 may be utilized as an additional reinforcement for the heel 10. This construction is shown in FIG. 2. In this figure the heel 28 is also provided with a tube 29 similar to the form shown in FIG. 1. The heel 30 is molded to a head 31 as shown in FIG. 3. However, in this form the shank 32 is elongated so that it extends through the very narrow portion of the heel. The shank 32 may also be of hardened steel so that when it is forced into the position shown in FIG. 2 it not only holds the tap 30 in position but acts as an auxiliary reinforcement for the heel 28.

It is contemplated that the tap be composed of any of the new tough yieldable materials commonly called "plastic." The term "plastic" as used in the specification and claims herein therefore includes any of these materials including nylon, polyamide resin or polyurethane, acrylonitrile, butadiene, styrene, or any of the other suitable synthetic resins. The above description also states that the tap material is molded to the head of the shank. The word "molded" includes injection molding, compression molding, or casting.

The present invention thus provides a novel gripping and mounting means for a replaceable nylon or plastic tap for a reinforced plastic heel in which the reinforcement is provided by a tubular hardened core. Other advantages of the present invention will be readily apparent to a person skilled in the art.

I claim:

A replaceable tap for a narrow plastic heel having a tubular reinforcing core extending from the tread end upwardly into the heel, comprising a shank, a plastic tap molded to one end of said shank, and means on said shank cooperating with said plastic tap for locking said tap to said shank and for preventing relative rotation between said tap and said shank, said means including an enlarged head on said shank, the outer face of said head being roughened, the inner face of said head having a central raised portion surrounding said shank and a scalloped portion adjacent the periphery surrounding said raised portion, and a spider member mounted on said shank adjacent said enlarged head, said spider member having a flat annular central portion with integral radially extending arms, said arms extending radially beyond the periphery of said enlarged head, the ends of said arms being bent at right angles toward the head end of said shank, said spider having an extruded central opening forming a collar for frictionally engaging said shank, said shank having a slightly larger diameter than said reinforcing core, said tap being retained on the said heel when said shank is driven into the said reinforcing core, said shank being fluted for frictional engagement with the said reinforcing core and having a narrower locating portion at the thrust end.

References Cited in the file of this patent

UNITED STATES PATENTS

| | | |
|---|---|---|
| 2,069,585 | Marchant | Feb. 2, 1937 |
| 2,544,878 | Dratler | Mar. 13, 1951 |
| 2,940,186 | Boldt | June 14, 1960 |

FOREIGN PATENTS

| | | |
|---|---|---|
| 1,214,600 | France | Nov. 9, 1959 |
| 1,219,090 | France | Dec. 21, 1959 |
| 1,227,916 | France | Mar. 7, 1960 |
| 1,238,402 | France | July 4, 1960 |